March 10, 1925.                         1,529,527
W. WIRRENGA
FLYWHEEL MOUNTING
Filed April 26, 1924

Wilbur Wirrenga
INVENTOR

BY Victor J. Evans
ATTORNEY

WITNESS:

Patented Mar. 10, 1925.

1,529,527

UNITED STATES PATENT OFFICE.

WILBUR WIRRENGA, OF ADRIAN, NORTH DAKOTA.

FLYWHEEL MOUNTING.

Application filed April 26, 1924. Serial No. 709,291.

*To all whom it may concern:*

Be it known that I, WILBUR WIRRENGA, a citizen of the United States, residing at Adrian, in the county of La Moure and State of North Dakota, have invented new and useful Improvements in Flywheel Mountings, of which the following is a specification.

This invention relates to improved means for connecting a fly wheel with the shaft, the general object of the invention being to provide means for frictionally connecting the fly wheel with the shaft so that the machinery to which the shaft is attached can be brought to a stop without stopping the fly wheel, thus preventing damage to the machinery from the sudden stoppage of the fly wheel.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
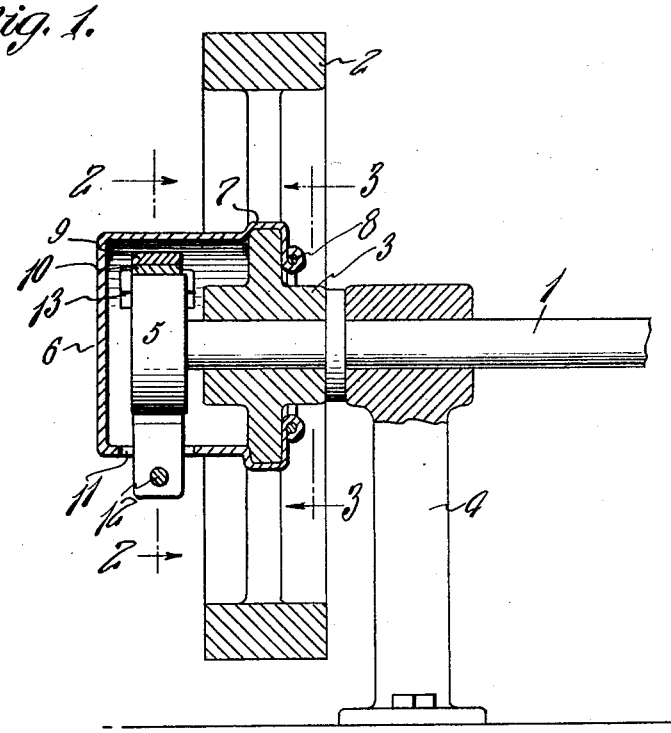
Figure 1 is a sectional view through the invention.
Figure 2:
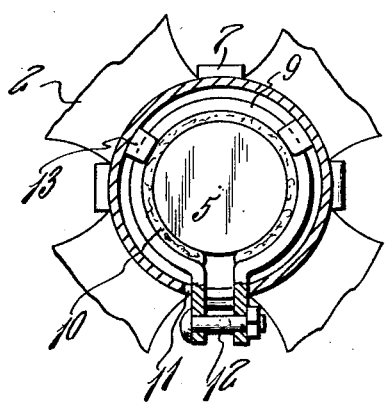
Figure 2 is a section on line 2—2 of Figure 1.
Figure 3:
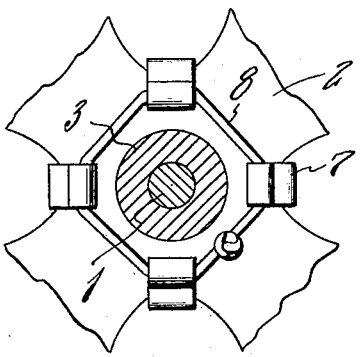
Figure 3 is a section on line 3—3 of Figure 1.

In these views, 1 indicates a shaft, to which the fly wheel 2 is rotatably connected by means of the hub 3. The shaft forms part of any suitable kind of machinery and one of its supports is shown at 4. A disc 5 is connected with the outer end of the shaft 1 and a housing 6 is connected with the fly wheel by means of the ears 7 formed on the inner end of the housing being bent over the portions of the fly wheel between the inner ends of the spokes and fastened together by the flexible member 8. Thus the housing is caused to rotate with the fly wheel. This housing encloses the disc 5 and a brake band 9 having a brake lining 10 engages the disc and has its ends passing through an opening 11 formed in the housing with a bolt 12 connecting the ends together so that the pressure of the lining on the disc can be regulated. A number of pairs of ears 13 are formed on the housing and engage the brake band and act to hold the same against lateral movement.

From the foregoing it will be seen that the brake band and its lining will frictionally engage the disc 5 and as this band and lining are caused to rotate with the housing and wheel, the wheel is consequently frictionally connected with the shaft so that if the shaft or the machinery attached thereto is suddenly stopped the fly wheel can continue to rotate as the brake band will slip on the disc. Under normal conditions, however, the fly wheel will rotate with the disc so that it will serve the functions of the fly wheel. By having the separated ends of the bands extending outside the housing the pressure of the lining on the disc can be regulated without removing the housing.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a shaft and a fly wheel rotatably mounted thereon, a disc on the shaft, a housing connected with the wheel and enclosing the disc and a brake band and lining engaging the disc and housing.

2. In combination with a shaft and a fly wheel rotatably mounted thereon, a housing connected with the fly wheel and enclosing an end of the shaft, a disc on said end of the shaft within the housing, a brake band surrounding the disc and having its separated ends extending through the housing, a lining carried by the band and engaging the disc and means outside of the housing for adjusting the ends of the band towards or away from each other.

In testimony whereof I affix my signature.

WILBUR WIRRENGA.